(12) United States Patent
Strock et al.

(10) Patent No.: US 8,931,429 B2
(45) Date of Patent: Jan. 13, 2015

(54) IMPINGEMENT PART COOLING

(75) Inventors: Christopher W. Strock, Kennebunk, ME (US); Dale R. Doucette, Berwick, ME (US)

(73) Assignee: United Technologies Corporation, Hartford, CT (US)

( * ) Notice: Subject to any disclaimer, the term of this patent is extended or adjusted under 35 U.S.C. 154(b) by 1987 days.

(21) Appl. No.: 12/115,121

(22) Filed: May 5, 2008

(65) Prior Publication Data

US 2009/0274848 A1 Nov. 5, 2009

(51) Int. Cl.
| | |
|---|---|
| B05C 13/00 | (2006.01) |
| B05C 11/00 | (2006.01) |
| C23C 4/00 | (2006.01) |
| C23C 4/02 | (2006.01) |
| C23C 4/12 | (2006.01) |
| C23C 4/18 | (2006.01) |
| H05H 1/28 | (2006.01) |
| H05H 1/42 | (2006.01) |

(52) U.S. Cl.
CPC ... *C23C 4/00* (2013.01); *C23C 4/02* (2013.01); *C23C 4/12* (2013.01); *C23C 4/18* (2013.01); *H05H 1/28* (2013.01); *H05H 1/42* (2013.01)
USPC .......... 118/69; 118/58; 118/724; 219/121.49; 219/121.58; 219/121.54

(58) Field of Classification Search
CPC .............. C23C 4/00; C23C 4/02; C23C 4/12; C23C 4/18; C23C 4/127
USPC ............ 118/58, 69, 724; 219/121.49, 121.58, 219/121.39, 121.67, 121.36, 121.54
See application file for complete search history.

(56) References Cited

U.S. PATENT DOCUMENTS

| | | | | |
|---|---|---|---|---|
| 3,895,449 | A | * | 7/1975 | Chance et al. .................. 34/638 |
| 4,017,213 | A | | 4/1977 | Przirembel |
| 4,121,083 | A | * | 10/1978 | Smyth ........................ 219/76.16 |

(Continued)

FOREIGN PATENT DOCUMENTS

GB     1 597 559 A     9/1981

OTHER PUBLICATIONS

European Search Report for EP Application No. 09250870.4, Mar. 25, 2010.

(Continued)

*Primary Examiner* — Dah-Wei D Yuan
*Assistant Examiner* — Stephen Kitt
(74) *Attorney, Agent, or Firm* — Carlson, Gaskey & Olds, P.C.

(57) ABSTRACT

This disclosure relates to a thermal spray coating system including a table that is configured to support a component. A spray torch is configured to direct a thermal spray at a component surface. A cooling device is arranged adjacent to spray torch and configured to be in close proximity to the component surface. The cooling device includes a manifold that is connected to an air supply. The manifold has a face with multiple impingement holes less than one-eighth inch (3.1 mm) in diameter that are configured to direct cooling air on the component surface. In one example, the diameter of the impingement holes is approximately 0.059 inch (1.5 mm) and provide cooling air at a velocity of at least 400 ft per second (122 meters per second). The face is arranged within one inch (25 mm) of the component surface, in one example. Accordingly, the above cooling device uses less air and yields more consistent results in thermal coating of the component.

5 Claims, 2 Drawing Sheets

(56) References Cited

U.S. PATENT DOCUMENTS

| | | | |
|---|---|---|---|
| 4,361,748 A | * | 11/1982 | Couch, Jr. ................. 219/121.5 |
| 5,100,291 A | * | 3/1992 | Glover ........................ 415/115 |
| 5,249,358 A | | 10/1993 | Tousignant et al. |
| 5,380,150 A | | 1/1995 | Stahl |
| 5,770,273 A | | 6/1998 | Offer et al. |
| 6,528,118 B2 | | 3/2003 | Lee et al. |
| 7,060,366 B2 | | 6/2006 | Gupta et al. |
| 7,115,832 B1 | | 10/2006 | Blankenship et al. |
| 7,166,372 B2 | | 1/2007 | Bose et al. |
| 7,226,668 B2 | | 6/2007 | Nagaraj et al. |
| 7,226,672 B2 | | 6/2007 | Litton et al. |
| 7,291,403 B2 | | 11/2007 | Nagaraj et al. |
| 7,306,859 B2 | | 12/2007 | Wortman et al. |
| 2005/0271514 A1 | | 12/2005 | Lee et al. |
| 2008/0087359 A1 | | 4/2008 | Zurecki et al. |

OTHER PUBLICATIONS

EXAIR, "Super Air Amplifiers," www.exair.com/Cultures/en-US/Primary+Navigation/Products/ . . . , Apr. 11, 2008.

\* cited by examiner

IMPINGEMENT PART COOLING

BACKGROUND

This disclosure relates to an impingement cooling device for use in a system in need of component cooling, for example, a thermal spray coating process.

Some aircraft components, such as burner liners, are thermally sprayed with a polymer containing ceramic and metallic materials to improve the thermal properties of the component. Burner liners, for example, have an annular outer surface and an annular inner surface that are thermally coated. The conditions during coating application must be tightly controlled to achieve desired thermal coating deposition. To provide a uniform thermal coating on the outer surface, the burner liner is rotated at a predetermined speed on a table and the spray torch is moved vertically at an indexing rate. Additionally, the spray torch's distance from the component, the plasma conditions, and material feed rate are controlled during deposition. The temperature of the component must also be controlled to avoid an undesired porosity level in the thermal coating and maintain desired deposition efficiency. The component temperature also affects the other thermal coating parameters.

One type of ceramic coating process uses an air plasma spray that produces significant heat in the component being coated. A typical coating process must accommodate components of various sizes. As a result, smaller diameter parts become hotter than larger diameter parts. The difference in temperature between different sized components thermally coated on the same machine makes selecting the desired thermal coating parameters difficult.

Cooling devices have been employed to control the temperature, but they have not been able to do so consistently. For example, one cooling setup has employed low velocity, high volume air nozzles, which are separate and discrete from one another, that are directed at the component surface. Air is supplied at a regulated pressure of about 45 psi (310 kPa), to achieve the desired high air flow rate of about 750 standard cubic feet per hour (scfh) (21 kilo liters per hour). The nozzle openings used were one-eighth inch (3.2 mm), and arranged parallel to and in close proximity to the spray plume at a distance of about 2.5 inches (63.5 mm) from the coating surface. Additionally, air amplifier blowers were used to generate a high flow rate of cooling air by entraining up to about ten times the flow rate of ambient air into about 3600 scfh (102 kL/h) each of compressed air supplied at about 80 psi (552 kPa). The air amplifier blowers were arranged between two and twelve inches from the component surface and provided a cooling air stream that was about two inches in diameter (51 mm). This cooling device arrangement was very sensitive to slight changes in thermal coating parameters, making thermal coating results erratic.

What is needed is a cooling device that uses less air while yielding more consistent results in the thermal coating.

SUMMARY

This disclosure relates to a thermal spray coating system including a table that is configured to support a component. A spray torch is configured to direct a thermal spray at a component surface. A cooling device is arranged adjacent to spray torch and configured to be in close proximity to the component surface. The cooling device includes a manifold that is connected to an air supply. The manifold has a face with multiple impingement holes less than one-eighth inch (3.1 mm) in diameter that are configured to direct cooling air on the component surface. In one example, the diameter of the impingement holes is approximately 0.059 inch (1.5 mm) and provide cooling air at a velocity of at least 400 ft per second (122 meters per second). The face is arranged within one inch (25 mm) of the component surface, in one example.

Accordingly, the above cooling device uses less air and yields more consistent results in thermal coating of the component.

BRIEF DESCRIPTION OF THE DRAWINGS

The disclosure can be further understood by reference to the following detailed description when considered in connection with the accompanying drawings wherein.

DETAILED DESCRIPTION

Figure 1:
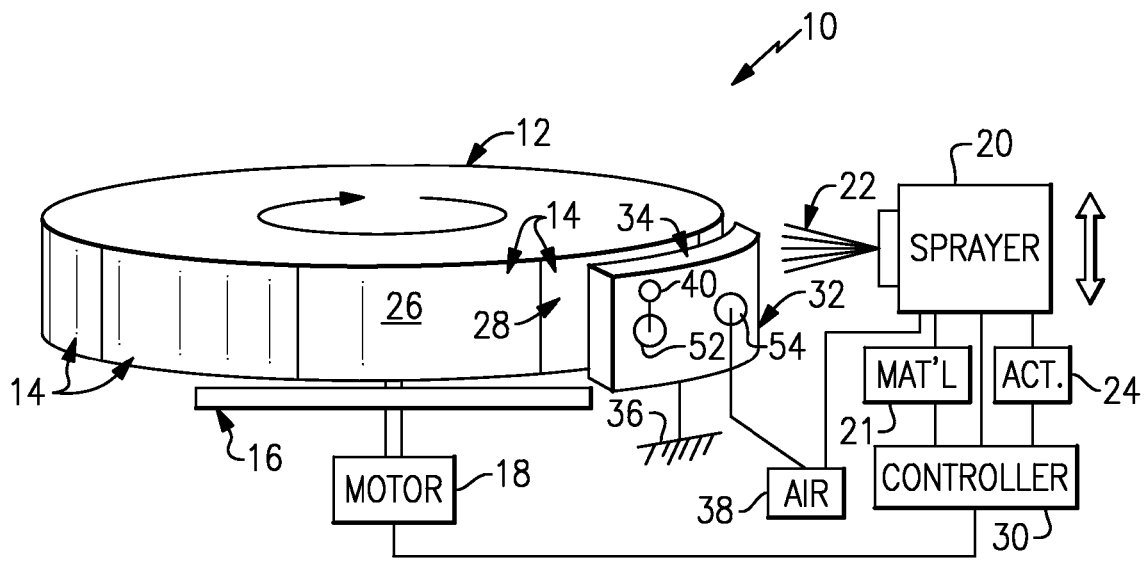
FIG. 1 is a schematic view of a thermal spray coating system.

A thermal spray coating system 10 is schematically shown in FIG. 1. The system 10 includes a component 12, which is annular in shape in the example. In one example, the component 12 is a burner liner that is constructed from multiple segments 14 joined to one another. The component 12 is supported on a table that is rotatively driven by a motor 18.

A spray torch 20 is arranged near a surface 26 of the component 12. The spray torch 20 receives material from a material source 21, which includes a polymer containing ceramic, and metallic materials, for example. As the component 12 is rotated, and actuator 24 moves the spray torch 20 vertically to apply a uniform coating 28 to the surface 26, a controller 30 is in communication with the motor 18, material source 21 and actuator 24 to control thermal coating parameters, such as component speed, torch indexing, material feed rates, gas flow rates, and in the case of plasma spray, electric power supply parameters such as amperage and power.

A cooling device 32 is arranged adjacent to the spray torch 20 in close proximity to where the spray 22 is deposited onto the surface 26. The cooling device 32 cools the component 12 to prevent an undesired porosity level in the coating 28 due to undesirably high temperatures. The cooling device 32 includes a manifold 34 that is supported by a fixed structure 36 relative to the component 12, for example, or, alternately, mounted to move with the spray torch. The cooling device 32 may also be mounted to be stationary with the part while the torch moves, or move with the part. A gas source 38 is connected to the manifold 34 to supply cooling gas, such as air. In one example, the gas source 38 is shop air typically at a pressure of approximately 80 psi (552 kPa). At this pressure, and with the close proximity of the cooling device 32 to the part, impingement air velocity is high and heat transfer to the air is efficient. That is, it is not necessary to use air amplifier blowers to amplify the air flow as in the prior art. A pressure gauge 40 is in communication with the manifold 34 to provide pressure information and ensure that the manifold 34 is receiving the desired amount of air.

Figure 2:
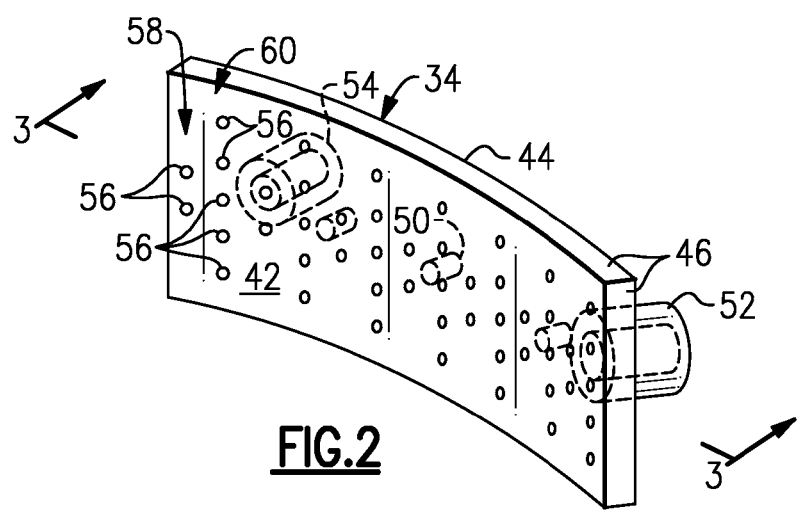
FIG. 2 is a perspective view of a cooling device used in the system shown in FIG. 1.
Figure 3:
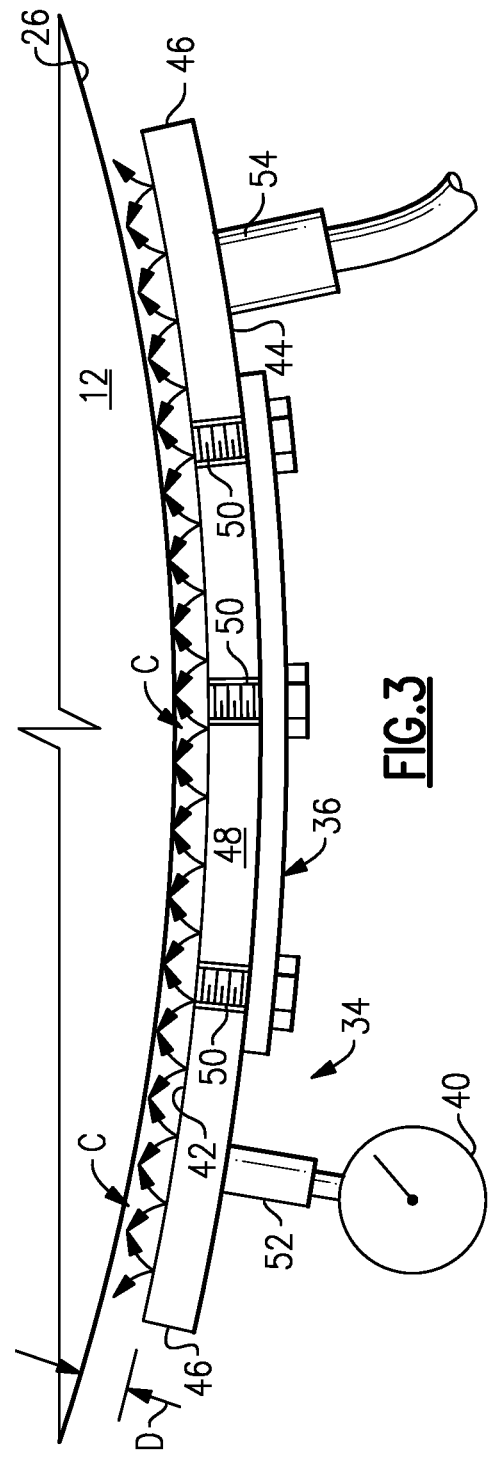
FIG. 3 is a cross-sectional view of cooling device taken along line 3-3 in FIG. 2, applying cooling air to a component.

Referring to FIGS. 2 and 3, the manifold 34 includes a face 42, which is arcuate in shape and complimentary in shape to the nearby surface 26. The face 42 is frustoconical as well in one example. The face 42 is spaced a distance D from the surface 26. In one example, the distance D is less than one inch (25 mm), and in another example, between 0.59 and 0.20 inch (15 and 5 mm). The manifold 34 includes a back plate 44 spaced from the face 42 and perimeter walls 46 adjoining the face 42 and back plate 44 to provide an enclosed cavity 48 that receives air from the gas source 38. The manifold 34 can be constructed from multiple welded members, or a cast or milled structure.

In one example, the cooling device 32 includes attachment structures 50, such as dowels or internally threaded sleeves, arranged within the enclosed cavity 48 between the face 42 and back plate 44. The attachment structure 50 enables the manifold 34 to be secured to the structure 36 in a desired position relative to the component 12. The back plate 44 includes a pressure gauge fitting 52 for connecting the pressure gauge 40. An air supply fitting 54 is provided on the back plate 44 to receive hoses that supply air from the gas source 38.

Figure 4:
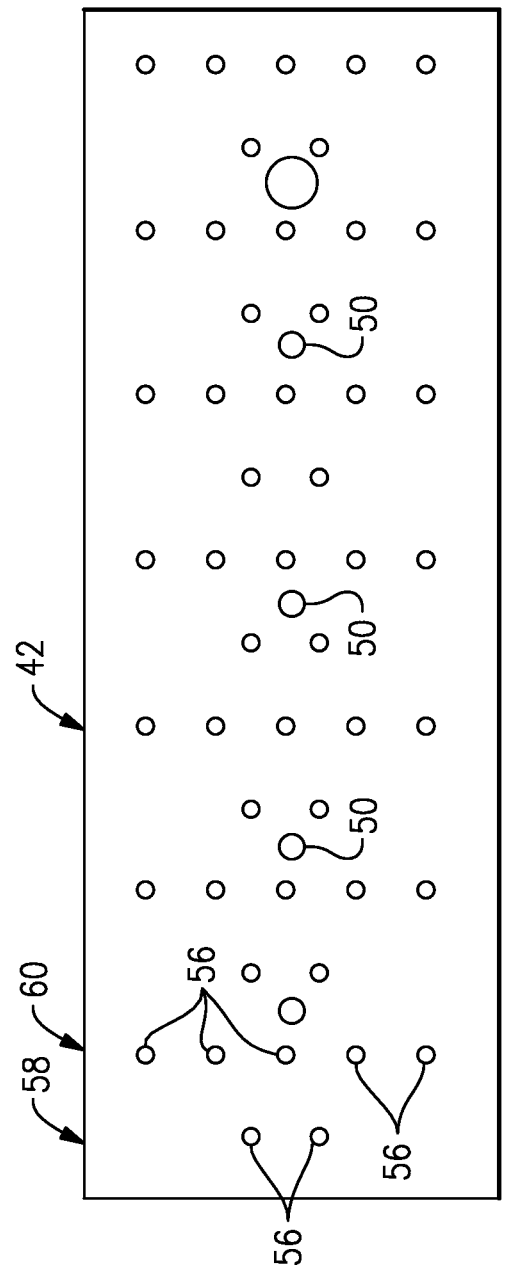
FIG. 4 is a plan view of a face of the cooling device, shown in FIGS. 2 and 3, illustrating multiple impingement holes.

The face 42 includes multiple impingement holes 56 that provide high velocity air to the surface 26. The prior art cooling devices use low velocity air to cool the component 12, which was ineffective. Referring to FIGS. 2 and 4, the face 42 includes first and second columns 58, 60 that have differing numbers of impingement holes 56. In the example shown, the impingement holes 56 have a diameter of less than one eighth inch (3.1 mm), and in one example, approximately 0.059 inch (1.5 mm). In one example, the pressure within the manifold 34 is approximately 20-45 psi (138-310 kPa) resulting in hole 56 exit velocities of approximately 500 ft/s (152 m/s) to the speed of sound. At sonic conditions the gas density and flow rate become proportional to absolute pressure, but velocity remains constant at the speed of sound. Fifty-five 0.059 inch (1.5 mm) holes at 25 psi (172 kPa) will produce an air velocity of 700 ft/s (213 m/s) and 3,000 scfh (85 kL/h) total flow rate. Cooling air C (FIG. 3) flows from the impingement holes 56 onto the surface 26 for maintaining the thermally sprayed surface at a desired temperature that prevents an undesired porosity level in the coating 28 and enables a more consistent part temperature regardless of part diameter. It is desirable to provide cooling air to the surface 26 at between at least 400 ft/s (122 m/s) to the speed of sound.

Although a preferred embodiment has been disclosed, a worker of ordinary skill in this art would recognize that certain modifications would come within the scope of the claims. For that reason, the following claims should be studied to determine their true scope and content.

What is claimed is:

1. A thermal spray coating system comprising:
   a table configured to support a component;
   a spray torch configured to direct a thermal spray at a component surface;
   a gas supply; and
   a cooling device configured to be laterally spaced away from the spray torch in one direction and in close proximity to the component surface, the cooling device including a manifold connected to the gas supply and having a face with multiple impingement holes less than 3.1 mm in diameter configured to direct cooling gas on the component surface, wherein the face is arranged within 25 mm of the component surface.

2. The system according to claim 1, wherein the manifold includes a back plate spaced from the face and perimeter walls adjoining the face and back plate to form a cavity that is in communication with the impingement holes.

3. The system according to claim 1, wherein the manifold includes an air supply fitting connected to the gas supply and a pressure gauge fitting configured to receive a pressure gauge.

4. The system according to claim 1, wherein the face includes multiple rows, including first and second rows having a different number of impingement holes from one another.

5. The system according to claim 1, wherein the impingement holes provide cooling gas at least 122 m/s.

* * * * *

UNITED STATES PATENT AND TRADEMARK OFFICE
CERTIFICATE OF CORRECTION

PATENT NO. : 8,931,429 B2  
APPLICATION NO. : 12/115121  
DATED : January 13, 2015  
INVENTOR(S) : Christopher W. Strock Page 1 of 1

It is certified that error appears in the above-identified patent and that said Letters Patent is hereby corrected as shown below:

IN THE CLAIMS:

In claim 5, column 4, line 36; after "gas" insert --at--

Signed and Sealed this
Nineteenth Day of May, 2015

Michelle K. Lee
*Director of the United States Patent and Trademark Office*